INVENTOR.
FRANCIS A. MILLER

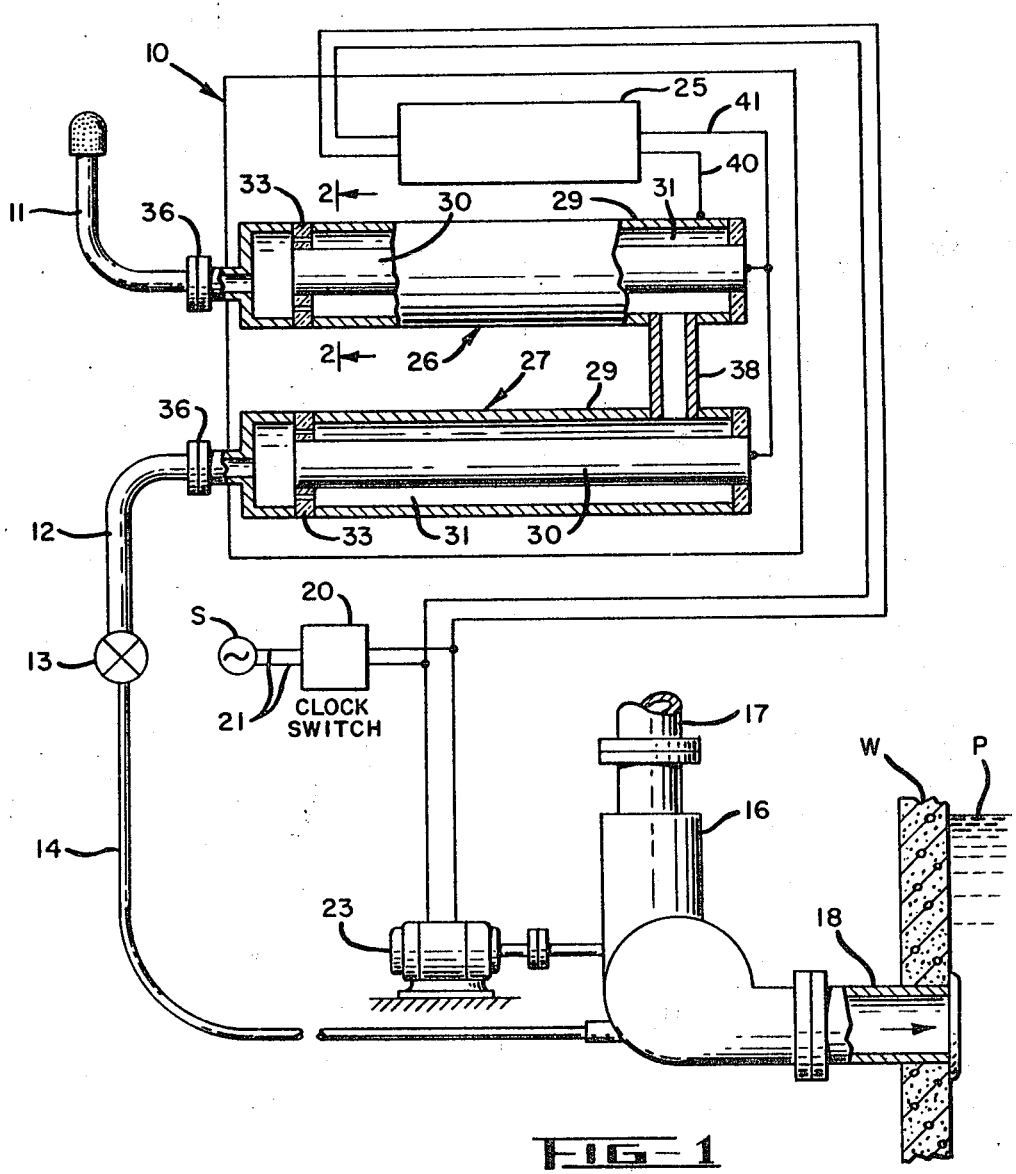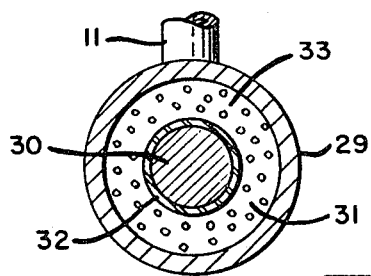

BY Leon F. Herbert
ATTORNEY

United States Patent Office 3,455,803
Patented July 15, 1969

3,455,803
OZONE PRODUCING APPARATUS AND METHOD UTILIZING A RESONANT CIRCUIT WHERE THE CAPACITANCE IS PROVIDED BY THE REACTANT FLUID
Francis A. Miller, Alameda, Calif., assignor to Puromatic, Inc., Sherman Oaks, Calif., a corporation of California
Filed Oct. 22, 1965, Ser. No. 501,954
Int. Cl. C01b 13/12, 13/10
U.S. Cl. 204—176                                  14 Claims

ABSTRACT OF THE DISCLOSURE

The production of ozone is disclosed utilizing a pulse modulator to supply power to the primary of a transformer, the secondary of which is connected to an ozonizer. The ozonizer and the transformer secondary comprise a parallel resonant circuit which produces ringing trains in response to the pulse supplied to the transformer by the pulse modulator. The inductive reactance of the transformer secondary is preferably equal to the capacitive reactance of the ozonizer at the resonant frequency of the resonant circuit. With the preferred structure the losses within the resonant circuit are such that the phase relationship of the voltage and current at the resonant frequency of the resonant circuit is about 90°.

---

This invention relates to ozone production techniques and more particularly to apparatus for and a method of producing ozone in quantities useful for sterilizing large volumes of matter such as the water in swimming pools or the air around sewage treatment plants.

Ozone is a strong bactericidal agent and as such has a useful application in the sterilization of water or air. However, prior techniques for producing ozone from air have been inefficient and generally are unsatisfactory for quantity production of ozone at a cost sufficiently low to make this gas practicable for sterilizing swimming pools, for example.

An object of this invention is the provision of apparatus for producing ozone from air in large quantities and at relatively low cost.

Another object is the provision of an effective system for sterilizing swimming pools with ozone.

A further object is the provision of an ozone generator utilizing an oscillating circuit in which substantially all of the driving energy is utilized to convert oxygen into ozone.

Still another object is the generation of ozone without heating the apparatus or the gas.

Another object is the provision of ozone generating apparatus which changes the quantity of ozone generated in response to a change in requirement for the ozone.

A further general object is the provision of apparatus and a method for treating fluid with electrical energy to change it from one atomic state to another.

A specific object is the provision of an ozone generating system for swimming pools and the like in which ozone cannot leak from the generator or supply conduits into the surrounding space.

These and other objects of the invention are accomplished with an ozone generator which utilizes a parallel resonant circuit, or "ringing" circuit, to develop an electrostatic charge at high frequency across a capacitor having plates defining a conduit through which ozone-producing air is passed. In short, the capacitor of a ringing circuit is the transducer which converts oxygen to ozone. The resonant circuit is driven by a series of energy surges or shocks developed by a silicon controlled rectifier pulse modulator or the like. Air is moved over and between the capacitor plates by suitable means, such as by connection of the output or ozone feed line to the low pressure side of the circulating pump for a swimming pool. Such a system operates at subambient pressures and so ozone cannot leak from the lines.

Other objects of the invention will become apparent from the following description of a preferred embodiment thereof, reference being had to the accompanying drawings in which:

FIGURE 1 is a schematic view of an ozone generating system embodying the invention;

FIGURE 2 is an enlarged transverse section taken on line 2—2 of FIGURE 1;

Figure 3:
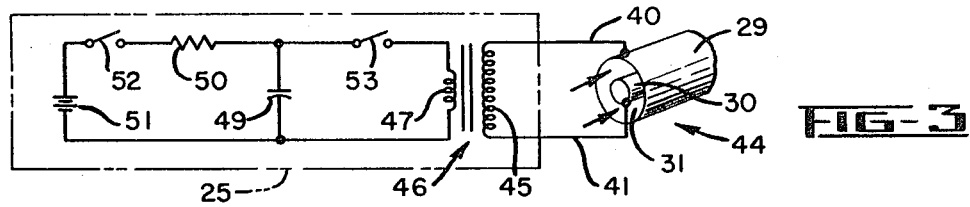
FIGURE 3 is a simplified diagram of the driving and resonant circuits in the ozone generator.

Referring now to the drawings, a system embodying the invention is shown in FIGURE 1 as apparatus for sterilizing an artificial swimming pool P. Such apparatus comprises an ozone generator 10 having an air intake conduit 11 and an ozone output conduit 12. An on-off valve 13 controls the flow of ozone from the generator and is connected by a feed tube 14, preferably made of polypropylene, to the low pressure side of a recirculating pump 16 for the swimming pool P. Pipe 17 carries fresh or recirculated water to the pump and discharge pipe 18 connects through pool wall W to the interior of the pool. The pressure of the gas in conduit 12 and tube 14 is reduced by the action of pump 16 below the ambient pressure which causes air to be drawn through conduit 11 into the apparatus. If a leak should develop in these lines, air will be drawn from the outside into the lines and no ozone can escape to the outside.

It will be understood that the description herein of the ozone generator as apparatus for sterilizing a swimming pool is merely exemplary and is not by way of limitation. Many other applications for which ozone in large quantities has utility and advantage are contemplated for embodiments of the invention, such as deodorizing sewage, providing rapid oxidation in industrial chemical processes, and purifying containers, machinery and facilities in the food and drug industry. The invention is broadly concerned with the efficient quantity generation of ozone which make this gas practicable for many purposes, one such use being the sterilization of artificial swimming pools.

The system is energized by a suitable source S of electrical power, which preferably is alternating current at 115 volts and 60 cycles. A clock actuated switch 20 in power line 21 controls the timing (duration and number of cycles) of simultaneous operation of the pump motor 23 and ozone generator 10. Generator 10 operates only when the pool pump motor is energized.

Ozone generator 10 comprises an oscillator network 25 and coaxial capacitor elements 26 and 27 through which air from intake conduit 11 is successively drawn by pump 16. Capacitor elements 26 and 27 are substantially identical in construction and therefore like reference characters indicate like parts on the drawings.

Each capacitor element has a tubular outer conductor 29 and an inner rod-like conductor 30, see FIGURE 2, defining an annular elongated chamber 31 therebetween. Inner conductor 30 preferably is electrically insulated by an insulator covering 32 and is supported on outer conductor 29 by a perforated inner disk 33 at one end and by a cap 34, preferably made of electrical insulator material. A pipe fitting 36 at the one end of the outer conductor tube, the left end as viewed in the drawing, permits connection to either the air inlet conduit 11 or ozone output conduit 12. The annular chambers 31 at opposite ends of the outer conductors, the right ends as viewed, are electrically and pneumatically interconnected by a transverse electrically conductive tube 38 so that air passes through substantially the entire length of each capacitor element on the way from intake conduit 11 to output conduit 12.

Outer conductors 29 of both capacitor elements are electrically connected by line 40 to network 25 and the inner conductors 30 are similarly connected to the network by line 41. The air in each annular chamber 31 together with the dielectric covering 32 constitutes the dielectric for the capacitor element, and conductors 29 and 30 are the capacitor element plates. In practice, outer conductors 29 are grounded for safety, and the inaccessible insulated inner conductors 30 are connected to the high potential side of the energizing circuit.

In accordance with the invention, capacitor elements 26 and 27 jointly comprise the capacitor in a tank or parallel resonant circuit 44, see FIGURE 3, having an inductor 45 which may constitute the secondary winding of a transformer 46 having a primary winding 47. The dimensions of outer conductors 29 and inner conductors 30 and of insulation 32 forming the capacitor elements, shown as one element in FIGURE 3 for simplicity are selected to provide a capacitive reactance, when filled with air, substantially equal to the inductive reactance of inductor 45 at a predetermined (resonant) frequency. This tank circuit is excited by an energy surge developed across the primary winding 47 by the discharge of a charged capacitor 49. For clarity of explanation, the exciting circuit is shown simply as the charging capacitor 49 which is charged through resistor 50 from battery 51 when switch 52 is closed and switch 53 is open, and which is discharged suddenly through the transformer primary when switch 53 is closed. The charging circuit and the winding 45 of the tank circuit comprise the network 25 in FIGURE 1.

The voltage induced in winding 45 is stepped up to an increased value because of the higher number of turns in the secondary. The rapid change of current in the primary 47 excites or "shocks" the tank circuit into oscillatory excursions of substantial amplitude and high frequency. Since the inductive reactance of winding 45 and the total capacitive reactance of capacitor elements 26 and 27 are equal, energy oscillates between the electromagnetic field of the inductance and the electrostatic field of the capacitance with a minimum loss in the circuit, and such oscillation continues after the shock surge has ceased. In other words, the circuit oscillates in the manner of the well-known "ringing circuit." As air passes through the capacitor elements, the high electrostatic field successively developed across the annular spaces 31 acts on the oxygen in the air therewithin to ultimately convert it into ozone as described below. The gas passing through outlet conduit therefore contains a high percentage of ozone. The feed tube 14 carries the ozone to the pump which mixes it with water being pumped into the pool to sterilize it.

Switches 52 and 53 used to charge and discharge driving capacitor 49 may be mechanical or electronic. In practice, an inductor performs the function of switch 52, and a gas discharge tube controls the operation of a solid state device which acts as switch 53. Also, the source of charging current, illustrated in FIGURE 3 as a battery, may be and preferably is rectified alternating current.

When the system is energized, the charging and discharging of capacitor 49 preferably occurs continuously in the manner of a relaxation oscillator. The repetition rate of capacitor discharge may be adjusted by selection of circuit parameters to so excite tank circuit 44 at a predetermined rate related to the consumption of the ozone produced, or may be variably controlled or programmed to adjust the rate of ozone production to the demand or need. While capacitor 49 is charging, tank circuit 44 continues to oscillate or "ring" in the manner of a gong and the energy coupled into the tank circuit oscillates between the electromagnetic field across inductor 45 and the electrostatic field across capacitor elements 26 and 27 at a resonant frequency determined by the inductive and capacitive reactances of these elements. The energy transfer to the air dielectric of the capacitor elements is thus sustained by this resonant circuit at a high frequency.

The high efficiency of conversion of air into ozone in accordance with this invention is attributable in substantial measure to utilization of the ringing circuit which operates without the usual power loss caused by low power factors commonly present in reactive circuits. Since the inductive reactance of the transformer secondary winding 45 is equal to the capacitive reactance of the ozone-producing capacitor elements 26 and 27, the phases of the current and voltage components of the energy in the ringing circuit are ideally spaced 90 electrical degrees apart and there is no substantial power loss developed across the capacitor elements. In practice, the phase spacing is 86 degrees. This minimization of power loss in the capacitor elements not only conserves energy but has the additonal important advantage of proportionally minimizing heating of the gas, thereby facilitating temperature stabilization of the ozone and reducing or eliminating entirely auxiliary apparatus for cooling the generator. Ozone breaks down at elevated temperatures into oxygen and therefore generation of ozone without heat has this aditional advantage of preserving the end product.

The electrical stress to which the oxygen passing through capacitor elements 26 and 27 is subjected is believed to convert the gas into an ionized medium or plasma characterized by separation of the nucleus and electrons. This disassociation of the gas molecules is a nuclear phenomenon and occurs when the electrical stress placed upon the gas exceeds a predetermined threshold level. The rate of change of the high frequency electrical current across the capacitor elements' plates induces molecular disassociation of the oxygen and creates the plasma within these capacitor elements. As the plasma passes from the annular space 31 of element 27, the electrical stress on it is suddenly relieved, causing a partial return of the nucleus and electrons toward their original relative positions and resulting in the formation of ozone. The step up of voltage by transformer 46° raises the electrical stress level developed in circuit 44 above the plasma-forming threshold.

Figure 4:
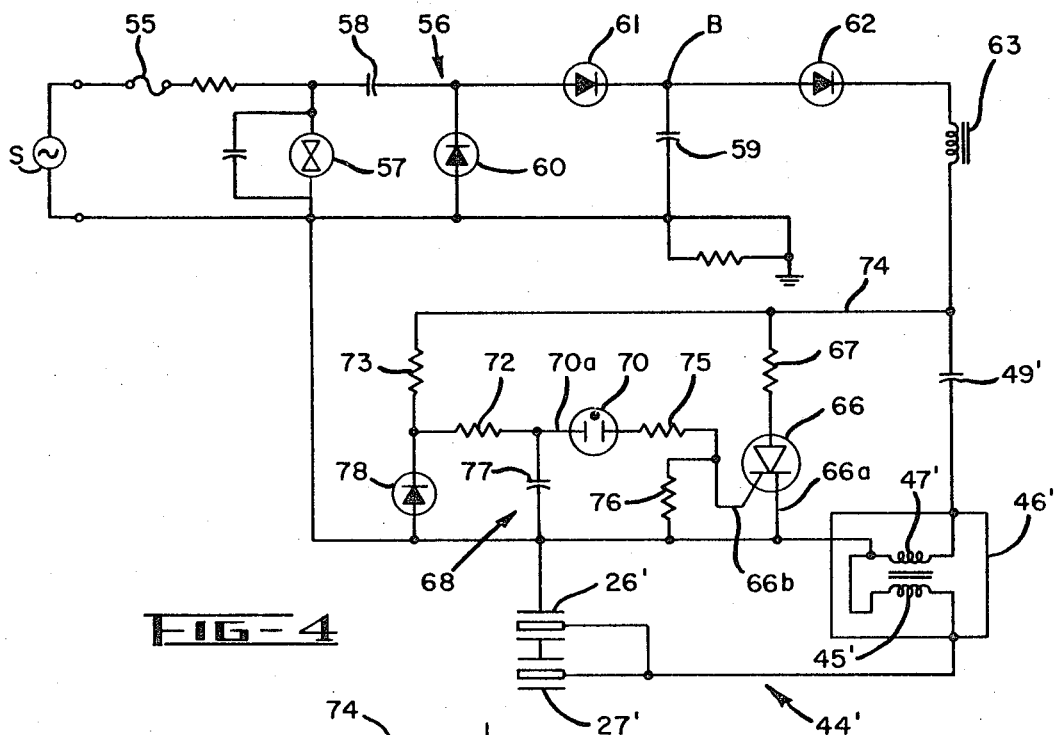
FIGURE 4 is a detailed circuit diagram of the ozone generator.

A more detailed diagram of charging and resonant circuits useful in the practice of the invention is illustrated in FIGURE 4. A source S of alternating current, such current at 115 volts of 60 cycles per second, is connected by fuse 55 to a half wave voltage doubler 56 comprising a transient limiting voltage suppression device 57 in shunt across the lines, storage capacitors 58 and 59 and shunt and series connected diodes 60 ad 61. Capacitors 58 and 59 charge on sucessive half cycles of the supply current through the diodes and develop a positive voltage at point B. This unidirectional voltage is applied by hold-off diode 62 to a voltage doubling inductor 63 forming part of the charging circuit for charging capacitor 49′ which corresponds to capacitor 49 of FIGURE 3. Capacitor 49′ is charged by the output of rectifier 56 and inductor 63 through the primary winding 47′ of transformer 46′ and back to the grounded side of the rectifier.

The discharge of capacitor 49′ through primary winding 47′ is controlled by a shunt connected switch 66, preferably a silicon controlled rectifier functioning as a solid state thyratron, in series with a resistor 67. Switch 66 has one terminal 66a connected to the side of primary winding 47′ opposite from capacitor 49′ and has a control terminal 66b to which a triggering bias potential is applied for causing the switch to close, i.e., to conduct. The rate or frequency at which capacitor 49′ is discharged is therefore controlled by the rate or frequency of triggering signals applied to switch terminal 66b. Diode 62 isolates rectifier 56 from discharging capacitor 49'. When capacitor 49' discharges, the voltage across it and across switch 66 decreases below the threshold potential required to maintain switch 66 in the conducting state, the switch opens and capacitor 49' begins to recharge.

The repetition rate at which capacitor 49' is discharged is proportional to the quantity of ozone generated by the capacitor elements 26' and 27' in tank circuit 44' and therefore control of the frequency of trigger signals applied to switch terminal 66b provides control of the rate of generation of ozone. The trigger signal frequency therefore is determined by the ozone production rate requirement and may be variable if this requirement is changeable or may be fixed for a constant production rate.

An automatic fixed frequency trigger generator 68 is shown in FIGURE 4 and comprises a neon gas switch tube 70 having a plate terminal 70a connected through resistors 72 and 73 and line 74 to the positive side of charging capacitor 49' and a cathode terminal 70b connected through resistors 75 and 76 to ground. A condenser 77 between plate terminal 70a and ground together with resistor 72 and neon tube 70 comprise a relaxation oscillator which controls the repetition rate at which capacitor 49' is discharge by switch 66. Diode 78 connected between ground and the junction of resistors 72 and 73 protects switch 66 from reversal during inductive reversal of primary 47' upon completion of discharge of capacitor 49'. Control terminal 66b of switch 66 is connected between resistors 75 and 76. As capacitor 49' charges, the increasing positive voltage across it is applied via line 74 to switch tube 70 until the firing or breakdown potential is exceeded and the tube fires. The surge of current through neon tube 70 produces a trigger signal across resistor 76 which turns on switch device 66 and causes capacitor 49' to discharge rapidly through it and primary winding 47'. When the voltage across capacitor 49' decreases below a level sufficient to maintain conduction of switch device 66 the latter creases to conduct (the switch "opens") and the charging cycle begins again.

The surge of current in primary winding 47' produced by discharging capacitor 49' excites a sinusoidal oscillation of high potential in secondary winding 45' of the transformer, and the tank circuit 44' consisting of the winding 45' and capacitor elements 26' and 27' is shocked into oscillation.

Figure 5:
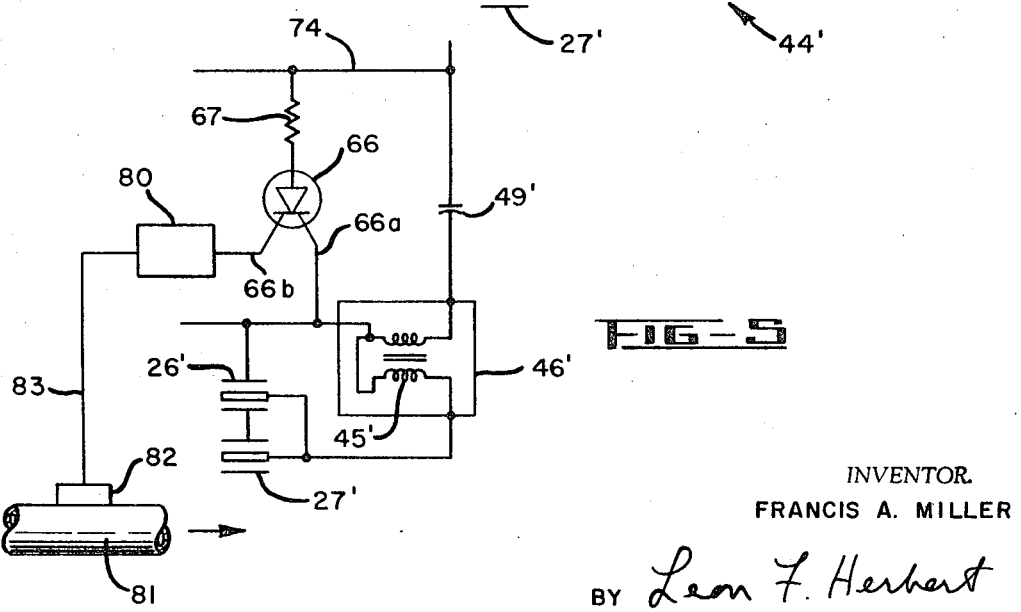
FIGURE 5 shows part of the circuit of FIGURE 4 with a modified form of control for changing the frequency of discharge of the driving capacitor.

A modified form of the invention is shown in FIGURE 5 in which the control terminal 66b of switch 66 is connected to a variable frequency trigger signal generator 80. The frequency of the trigger signals from generator 80 is dependent upon a condition related to the requirement for ozone, such as the rate of flow of liquid to be purified with the ozone. Thus, a pipe 87 through which liquid to be purified flows has a flow detector 82 which senses the rate of flow and produces an analog signal on line 83 to control the frequency of trigger signals produced by the generator. The ozone is therefore produced in accordance with the demand or need.

Changes, modifications and improvements may be made to the above-described embodiment of the invention without departing from the spirit and scope thereof. For example, there may be only one coaxial capacitor element 26, 27 or there may be three or more, and such elements may be connected in parallel as well as in series. While gas is moved through the above-described embodiment of the invention by reduction of pressure at the delivery end of the ozone generator, such movement may be induced by increased pressure at the intake side or by other suitable means. Also, the invention in its broader context is applicable to the treatment of fluids other than air. The appended claims therefore define the scope as well as the essential features of novelty of the invention.

I claim:

1. A device for treating a gaseous fluid with electrical energy so as to cause a change in molecular state within said fluid, said device having a pulse modulator connected to the primary of a transformer for the purpose of supplying a sequence of pulses at an input rate to said transformer and a treatment structure having two spaced electrodes and a passage between said electrodes and an inlet and outlet to said passage so as to permit said fluid to be moved through said treatment structure through which said fluid is passed during the use of said device and power driven means for maintaining flow of said gaseous fluid through said treatment structure wherein the improvement comprises:

said treatment structure and the secondary of said transformer comprising a parallel resonant, tuned circuit designed so that the frequency of the natural oscillations thereof is significantly higher than the input pulse rate which produces ringing trains of successively decreasing magnitude in response to the pulse supplied to said transformer by said pulse modulator said treatment structure serving as a capacitor in said circuit.

2. A device for treating a gaseous fluids with electrical energy so as to cause a change in molecular state within said fluid, said device having a pulse modulator connected to the primary of a transformer for the purpose of supplying a sequence of pulses at an input rate to said transformer and a treatment structure having two spaced electrodes and a passage between said electrodes and power driven means for maintaining flow of said gaseous fluid through said treatment structure through which said fluid is passed during the use of said device wherein the improvement comprises:

said treatment structure and the secondary of said transformer comprising a parallel resonant, tuned circuit designed so that the frequency of the natural oscillations thereof is signicantly higher than the input pulse rate which produces ringing trains of successively decreasing magnitude in response to the pulses supplied to said transformer by said pulse modulator said treatment structure serving as a capacitor in said circuit;

the inductive reactance of said transformer secondary being equal to the capacitive reactance of said treatment structure at the resonant frequency of said circuit, and the losses within said circuit being such that the phase relationship of the voltage and current during the operation of said pulse modulator at the resonant frequency of said circuit is about 90°.

3. A device as claimed in claim 2 wherein:

said phase relationship of the voltage and current is 86°.

4. A device as claimed in claim 2 wherein:

said device is a device for producing ozone from normal oxygen in the air;

said treatment structure is an ozonizer having separate, spaced electrodes and, said passage is located between said electrodes.

5. A device as claimed in claim 4 wherein:

said electrodes in said ozonizer are tubular, coaxial conductors located concentric to one another.

6. A device as claimed in claim 2 wherein:

said pulse modulator is a pulse generator for energizing said resonant circuit and causing it to produce damped oscillations, said oscillations ringing at the resonant frequency of said resonant circuit whereby, the energy of said oscillations successively developing an electrostatic field between said electrodes extending across said passage for causing a change in molecular state within said fluid.

7. A device as claimed in claim 2 wherein said pulse modulator includes:

a pulse-forming network connected to the primary of said transformer;

switching means for discharging said pulse-forming network;

charging means for charging said pulse-forming network, said charging means including a direct current supply and an impedance for providing an inductance cooperatively associated with said primary circuit to modulate said pulses.

8. A device as claimed in claim 7 wherein:
said pulse-forming network comprises a capacitor means and wherein;
said capacitor means is alternately charged and discharged at a frequency less than the resonant frequency of said resonant circuit.

9. A device as claimed in claim 7 wherein:
said switching means is a silicon-controlled rectifier;
said rectifier in said pulse modulator produces a sharp voltage pulse each time it conducts.

10. A device as claimed in claim 7 wherein:
said direct current supply is a rectifier type of power supply and said impedance is a charging reactor.

11. A device as claimed in claim 7 wherein:
said rectifier in said pulse-forming modulator produces a sharp voltage pulse each time it conducts.

12. A device as claimed in claim 2 wherein:
said device is a device for producing ozone from normal oxygen in the air;
said treatment structure is an ozonizer having separate spaced electrodes;
said electrodes in said ozonizer are tubular, coaxial conductors located concentric to one another;
said pulse modulator includes
  a pulse-forming network connected to the primary of said transformer;
  said pulse-forming network comprising a capacitor which is alternately charged and discharged at a frequency less than the resonant frequency of said resonant circuit;
  switching means for discharging said pulse-forming network, said switching means being a silicon-controlled rectifier, said rectifier producing a sharp voltage pulse each time it conducts;
  charging means for charging said pulse-forming network, said charging means including a direct current supply and an impedance, said direct current supply being a rectifier type of power supply and said impedance being a charging reactor.

13. A process for treating a gas comprising oxygen with electrical energy so as to cause a change in molecular state of said oxygen including the formation of ozone within said fluid which comprises:
passing said fluid between two spaced electrodes in a treatment structure while operating said electrodes and said treatment structure as a part of a parallel resonant, tuned circuit in which said treatment structure serves as a capacitor while supplying electrical energy across said circuit in pulses so that there are ringing trains of energy of successively decreasing magnitude between said pulses in said circuit appearing between said electrodes.

14. A process as claimed in claim 13 wherein:
the inductive reactance within said circuit is equal to the capacitive reactance between said electrodes of said treatment structure and
the losses within said circuit are such that the phase relationship of the resonant voltage and current as pulses are supplied to said circuit is about 90°.

References Cited

UNITED STATES PATENTS

| | | | |
|---|---|---|---|
| 3,205,162 | 9/1965 | McLean | 204—312 |
| 790,655 | 5/1905 | Otto | 204—317 |
| 1,169,825 | 2/1916 | Hoofnagle | 204—319 |
| 1,693,486 | 11/1928 | Lyon | 204—316 |
| 2,326,601 | 8/1943 | Arff | 204—318 |
| 2,615,841 | 10/1952 | Thorp et al. | 204—316 |
| 3,336,099 | 8/1967 | Czulak | 21—102 |

ROBERT K. MIHALEK, Primary Examiner

U.S. Cl. X.R.

204—317, 320, 312; 210—63

UNITED STATES PATENT OFFICE
CERTIFICATE OF CORRECTION

Patent No. 3,455,803                                    July 15, 1969

Francis A. Miller

It is certified that error appears in the above identified patent and that said Letters Patent are hereby corrected as shown below:

Column 4, line 46, "transformer 46°" should read -- transformer 46 --. Column 5, line 53, "pipe 87" should read -- pipe 81 --. Column 6, line 27, beginning with "trodes and a" cancel all to and including "comprises:" in line 31, same column 7 and insert the following:

> trodes and a passage between said electrodes and an inlet and outlet to said passage so as to permit said fluid to be moved through said treatment structure through which said fluid is passed during the use of said device and power driven means for maintaining flow of said gaseous fluid through said treatment structure wherein the improvement comprises:

Signed and sealed this 21st day of April 1970.

(SEAL)
Attest:

EDWARD M. FLETCHER, JR.                    WILLIAM E. SCHUYLER, JR.
Attesting Officer                             Commissioner of Patents